United States Patent [19]

Hopcroft

[11] 4,100,073

[45] Jul. 11, 1978

[54] WASTE-WATER TREATMENT SYSTEM

[76] Inventor: Francis J. Hopcroft, 56 Prospect St., Norwood, Mass. 02062

[21] Appl. No.: 702,959

[22] Filed: Jul. 6, 1976

[51] Int. Cl.² .............................................. C02C 5/10
[52] U.S. Cl. ................................. 210/532 S; 210/170
[58] Field of Search ...................... 210/17, 15, 62, 150, 210/151, 16, 170, 532 S, 18, 152, 290; 137/139

[56] References Cited

U.S. PATENT DOCUMENTS

| | | | |
|---|---|---|---|
| 252,344 | 1/1882 | Williams | 137/139 |
| 947,333 | 1/1910 | Hamilton | 210/16 |
| 1,950,841 | 3/1934 | Crawford | 210/532 S |
| 2,220,859 | 11/1940 | Bispham et al. | 210/16 |
| 2,432,887 | 12/1947 | Haviland | 210/532 S |
| 3,306,447 | 2/1967 | Medeiros | 210/170 |
| 3,680,704 | 8/1972 | Schaefer | 210/170 |
| 3,681,236 | 8/1972 | Bergles et al. | 210/62 |
| 3,755,157 | 8/1973 | Wisfeld et al. | 210/17 |
| 3,817,858 | 6/1974 | Yost | 210/15 |

Primary Examiner—Charles N. Hart
Assistant Examiner—Benoit Castel
Attorney, Agent, or Firm—Morse, Altman, Oates & Bello

[57] ABSTRACT

A wastewater treatment system is provided for use in treating the sanitary and grey waste waters from individual homes in areas where subsurface disposal of these wastes is not feasible and where discharge of treated effluent to a body of surface water is permitted. All toilet wastes, bath and shower wastes, and kitchen wastewater can be treated by this process and system. These wastes are cleansed, disinfected and clarified prior to discharge to the receiving body of water. The system includes a septic tank, a dosing chamber, an enclosed sand filter, and a disinfection unit operatively connected to one another for progressive cleansing, clarification and disinfection of the wastewater.

2 Claims, 5 Drawing Figures

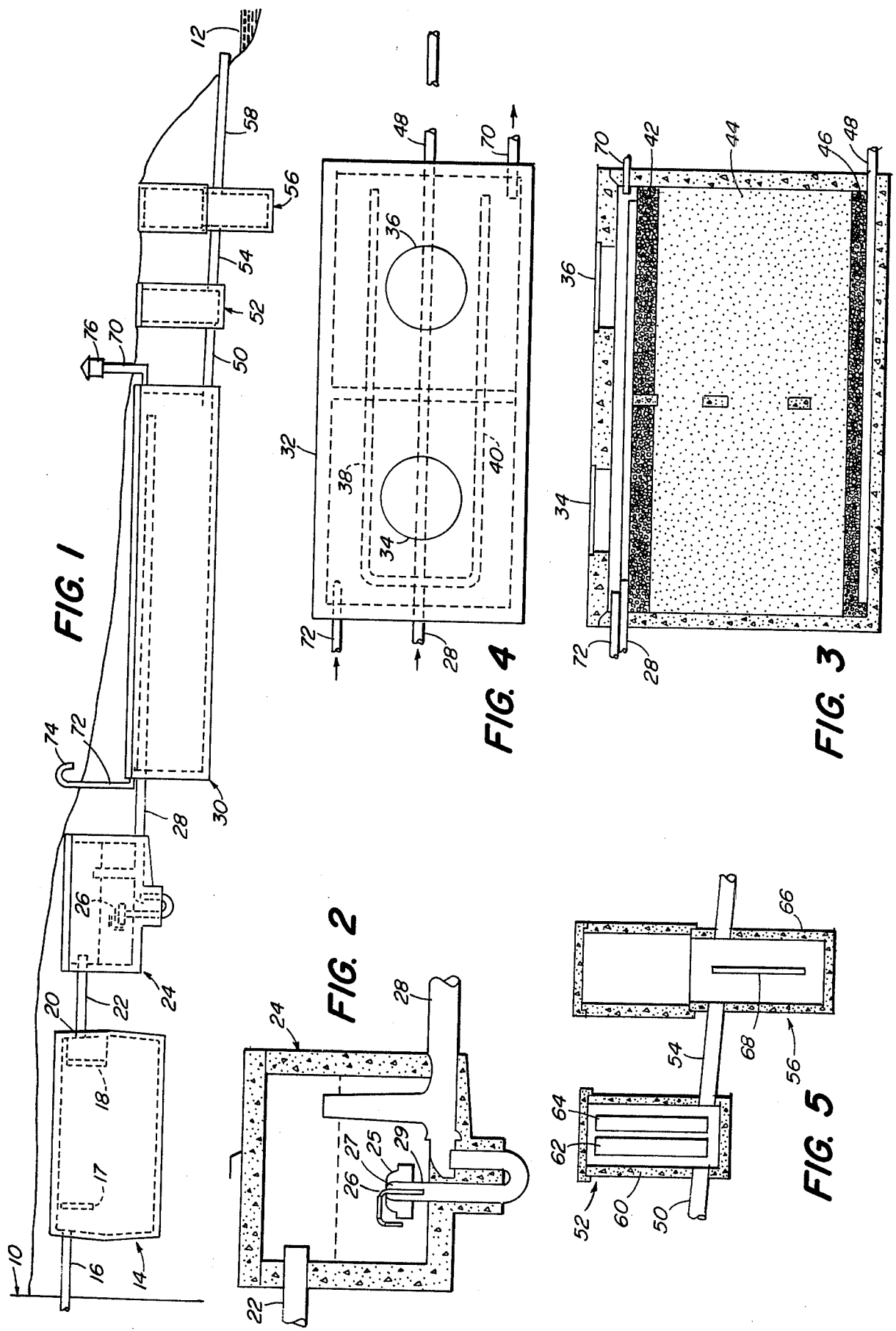

WASTE-WATER TREATMENT SYSTEM

BACKGROUND OF THE INVENTION

1. Field of the Invention

This invention relates generally to wastewater treatment systems and more particularly is directed towards improvements in secondary treatment systems as well as to components thereof.

2. Description of the Prior Art

Heretofore, small wastewater treatment processes have utilized a variation of the extended aeration process of wastewater treatment wherein air blowers, pumps, piping, valves, and complex mechanical agitation schemes are required to rapidly decompose the water borne wastes. Septic tanks have been utilized only where subsurface disposal of the partially cleansed liquid is possible. In those cases where sand filters have been utilized as an addition to the treatment chain, they have been closed sand filters requiring large areas of land and expensive construction techniques. Open sand filters, on the other hand, heretofore have been unsightly breeding grounds for insects, and prone to becoming odiforous in hot weather.

Accordingly, it is an object of the present invention to provide a system utilizing a septic tank as a primary treatment component, wherein anaerobic decomposition of the settlable solids will occur, an open sand filter, free of the drawbacks previously discussed, to remove suspended solids, and a disinfection unit to destroy pathogens and bacteria so that the treated effluent will be rendered safe for discharge to ocean waters, rivers or streams.

SUMMARY OF THE INVENTION

This invention features a wastewater treatment system including a properly sized septic tank discharging to a dosing chamber which, in turn, discharges to a vented sand filter with a carefully specified filter media and a disinfection unit receiving the discharge of the filter.

The raw wastewaters enter the septic tank where quiescent settling occurs. The settled solids and floating scums are decomposed anaerobically. The settled effluent passes into a dosing chamber which feeds the liquid to the sand filter at a preset rate. In the sand filter, suspended solids are removed as the liquid flows down through the filter media. Air is introduced to a void between the top of the filter media and the cover of the sand filter container by means of a pair of vent pipes to the outside atmosphere. This air allows the entrapped solids to decompose aerobically and also provides oxygen to sweeten the noxious odors from the anaerobic liquid entering the filter. After passing through the filter media, the liquid is collected and piped through a disinfection unit in which chlorine is added. Ozonation, ultraviolet radiation, or other disinfection techniques may also be utilized. The disinfected wastes are then allowed to flow into the receiving water.

BRIEF DESCRIPTION OF THE DRAWINGS

FIG. 1 is a sectional view in side elevation of a treatment system made according to the invention, FIG. 2 is a detail sectional view in side elevation of the dosing chamber employed in the system, FIG. 3 is a view similar to FIG. 2 showing the filter employed in the system, FIG. 4 is a top plan view of the filter of FIG. 3, and FIG. 5 is a view similar to FIG. 2 showing the chlorination portion of the system.

DETAILED DESCRIPTION OF THE PREFERRED EMBODIMENTS

Referring now to the drawings, and FIG. 1 in particular, there is illustrated a treatment system made according to the invention by means of which wastewater from a building 10, such as a dwelling, may be treated so as to make it suitable for discharge to an open body of water 12. The system includes a septic tank 14 receiving wastewater discharged from the dwelling 10 through a pipe 16 connected near the top of the septic tank 14. The septic tank may be provided in various sizes according to the estimated flow of wastewater from the dwelling 10. Recommended septic tank dimensions are provided by the following table which indicates flow rates for various tank sizes. The capacities shown are required for the estimated flows shown, but the actual dimensions and shape of the tank are not critical.

| Estimated Flow GPD | Tank Cap. Gals. | Length A | Width B | Invert C | Height D |
|---|---|---|---|---|---|
| 0 to 350 | 1,000 | 8'-0" | 5'-1" | 54.5" | 5'-4" |
| 0 to 350 | 1,000 | 10'-6" | 6'-4" | 37" | 4'-0" |
| 350 to 500 | 1,500 | 10'-6" | 6'-4" | 53" | 5'-4" |
| 500 to 700 | 2,000 | 10'-6" | 6'-4" | 63" | 6'-2" |

SEPTIC TANK DIMENSIONS

The septic tank 14 typically is a concrete casting formed with a transverse baffle 17 near the inlet thereof and a U-shaped wall 18 open at the top and bottom thereof opposite an outlet port 20. The septic tank outlet connects to a pipe 22, typically four inches in diameter, which, in turn, delivers the discharge from the septic tank to an automatic syphon dosing chamber 24. The dosing chamber 24 is provided with a automatic syphon system 26 which discharges liquid collected in the chamber 24 at a predetermined rate per dose, and by way of example, the syphon would typically be set to discharge at a rate of 100 gallons per dose. The system 24 includes a weighted float 25 that opens an inlet drain 27 on top of a pipe 29 when the liquid level is at a high point and closes when the level is at a low point.

The syphon apparatus discharges through a pipe 28, typically four inches in diameter, to the top portion of a filter 30. The filter 30, as best shown in FIGS. 3 and 4, is comprised of a boxed housing 32, typically of cast concrete, which must be provided with access manholes 34 and 36 in the top wall thereof. The inlet pipe 28 passes into the upper portion of the housing and forms into parallel branch arms 38 and 40, which arms are perforated pipes, typically four inches in diameter, and preferably fabricated from a durable plastic material such as PVC or the like. The arms extend substantially the full length of the filter and serve to disperse the dose of liquid fed therein over the surface of filter media substantially filling the housing.

The filter media is comprised of an upper stratum 42 of peastone, a center stratum 44 of sand and a bottom stratum 46 of peastone. In the preferred embodiment of the filter media the peastone stratum 42 is approximately six inches deep and is comprised of peastone in a size of 3.0 to 6.0 millimeters over an area of 112 sq. feet. The sand stratum 44 preferably is 30 inches deep in a size range of 0.6 to 1.0 millimeters and a uniformity coefficient of 1.2 to 1.6. The top layer of peastone 42 serves to remove any large solids which have entered the filter 32 and to further disperse the incoming liquid. The sand layer 44 cleanses the liquid of fine suspended solids and most of the incoming $BOD_5$. The bottom layer of peastone 46 allows free movement of the cleansed liquid towards a collector pipe 48 which is typically a perforated four inch diameter pipe.

While in the septic tank 14, the wastes receive primary treatment consisting of a settling of the settlable solids and anaerobic reduction of $BOD_5$. After entering the sand filter 32 through the dosing chamber 24, the liquid passes through the three stage peastone and sand filter which cleans the liquid of fine suspended solids and most of the remaining $BOD_5$. The filtered liquid draining through the collection pipe 48 is delivered by means of a pipe, typically a four inch diameter pipe, 50 to a chlorinator 52 and thence by means of a pipe 54 to a contact chamber 56. A final section of pipe 58, typically four inches in diameter, discharges the treated liquid from the system into the receiving water 12.

The chlorinator 52 preferably is an upright cylindrical concrete casting 60 provided with a pair of internal upright tubes 62 and 64 for chlorine tablets. Hypochlorite tablets contained in the tube are dissolved by the flowing action of the liquid. The chlorinated effluent then flows through the pipe 54 to the chlorine contact chamber 56 which is also a cylindrical upright concrete casting 66 provided with an upright internal baffle 68. In the contact chamber 56 the effluent is detained for a minimum of fifteen minutes to allow all of the bacteria that may be contained within the liquid to be destroyed. The disinfected liquid then passes through the final pipe 58 to the receiving water 12.

The system also includes a pair of vents 70 and 72 typically comprised of four inch diameter pipes and both connecting to the filter housing 32 near the top thereof. The vent 72 is fitted with an elbow 74 to allow free passage of air into the sand filter. The other vent 70 is fitted with a four inch wind activated ventilator 76 to draw air out of the sand filter. The withdrawal of air through the vent 72 forces clean air to be drawn in through the vent 70. This exchange of air keeps the atmosphere above the filter media aerobic. With the atmosphere above the filter media aerobic, a loading rate on the filter of three gallons per day per sq. foot of filter surface is allowable. Both the elbow 74 and the ventilator 76 are fitted with insect screens to prohibit insects from entering the filter.

While the invention has been described with particular reference to the illustrated embodiment, numerous modifications thereto will appear to those skilled in the art.

For example, while the illustrated system operates on a gravity flow basis, it could also be operated by means of a pump to transfer liquid through the system.

Having thus described the invention, what I claim and desire to obtain by Letters Patent of the United States is:

1. A wastewater treatment system including,
   (a) an anaerobic septic tank having an inlet adapted to receive raw wastewater including solid and liquid waste components and a first outlet conduit at the upper portion of said septic tank for discharging effluents therefrom, said septic tank providing primary anaerobic treatment of said wastewater,
   (b) a dosing chamber connected to said first outlet conduit of said septic tank whereby the effluent discharge of said septic tank is delivered to said dosing chamber for temporary storage therein, said dosing chamber including automatic dosing means for discharging a predetermined volume of liquid collected in said dosing chamber, and a second outlet conduit connected to said dosing means for discharging liquids therefrom,
   (c) a gravity filter connected to said second outlet conduit for removing solid particles suspended in the liquid discharged from the dosing chamber and for enhancing aerobic decomposition of said solid particles,
   (d) said filter including an enclosure and a filter bed disposed within said enclosure, said enclosure including top, bottom and side walls and connected at the top thereof to said second outlet conduit, a third outlet conduit connected to the bottom of said enclosure, said filter bed including an upper stratum of peastone, a middle stratum of sand, and a bottom stratum of peastone, the top surface of said upper stratum being spaced from said top wall to define a void therebetween coextensive with the top of the filter and said top wall, at least a pair of spaced atmospheric vents connected to the upper portion of said enclosure, communicating with said void, and adapted to automatically and continuously circulate fresh air across the top surface of said filter, and distribution means connected to said second outlet conduit and adapted to distribute the liquid discharged from said dosing chamber over the top of said filter bed, and collection means at the bottom of said filter connected to said third outlet conduit for collecting filtered effluent, and,
   (e) disinfection means connected to said third outlet conduit for disinfecting filtered liquid.

2. A wastewater treatment system, according to claim 1, wherein said distribution means includes a perforated distributor pipe within said filter connected to said second outlet conduit and having a plurality of portions disposed over the top of said upper stratum for distributing the liquid discharged from said dosing chamber over different portions of said upper stratum, said collection means including a collector pipe at the bottom of said bottom stratum connected to said third outlet conduit for collecting the filtered liquid.

* * * * *